Aug. 16, 1927.
G. E. McLAUGHLIN
1,638,950
MEASURING MACHINE
Filed Aug. 29, 1925
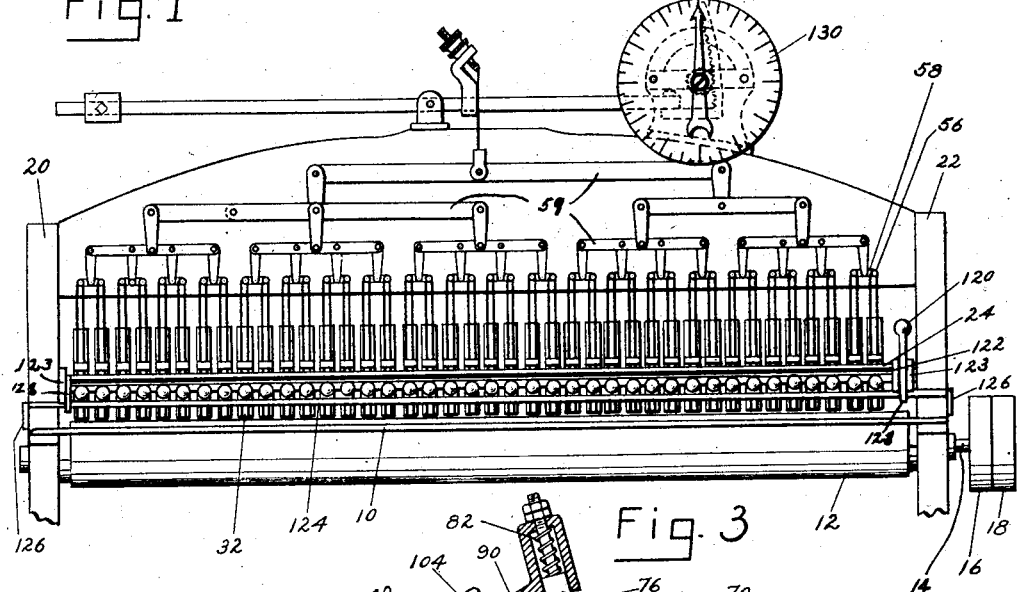
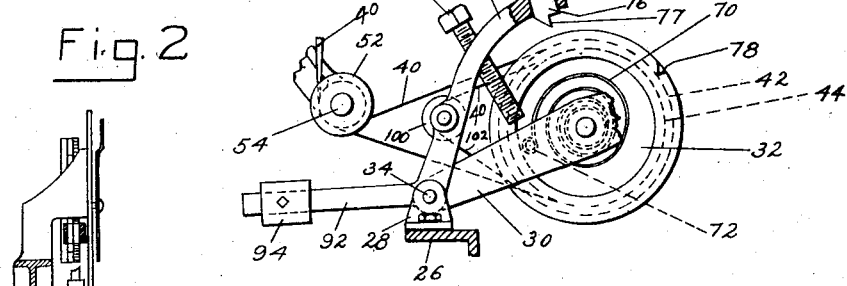
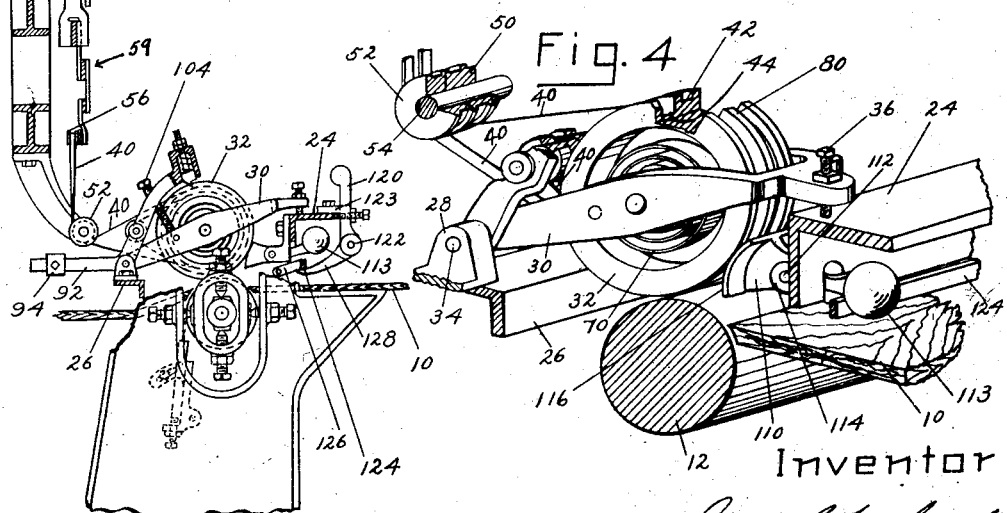
Inventor
George E. McLaughlin Patented Aug. 16, 1927.

1,638,950

UNITED STATES PATENT OFFICE.

GEORGE E. McLAUGHLIN, OF PEABODY, MASSACHUSETTS, ASSIGNOR TO THE TURNER TANNING MACHINERY COMPANY, OF PORTLAND, MAINE, A CORPORATION OF MAINE.

MEASURING MACHINE.

Application filed August 29, 1925. Serial No. 53,328.

This invention relates to measuring machines and, more particularly, to machines for measuring the surface areas of pieces of material.

As heretofore constructed measuring machines of the Sawyer type have commonly comprised a pointer movable over an indicator scale in an organization in which the pointer is operated by rotation of toothed wheels or segments geared to be rotated by measuring wheels making direct contact with the hide, skin, or other material being measured. In machines of this type the measuring wheels themselves have contributed a source of error due to the fact that they are lifted into operative connection with the registering mechanism considerably before they should be when a relatively thick piece of leather is entering between the measuring wheels and the bed roll. While the error is less with leather or other material having a small thickness dimension there is still an error since the machine is caused to commence its measuring operations before the entering edge of the material reaches the plane joining the axes of the measuring wheels and the bed roll, it being also understood that the larger the measuring wheel the greater will be the error irrespective of the thickness of the material. A further substantial objection to the construction of some types of measuring machines is due to the arrangement by which numbers of toothed members are caused to move into and out of mesh with each other in each of the intervals between measurements of successive pieces of work. With such a construction the amount of wear on all of the toothed members is very considerable and makes necessary constant inspection and replacement in keeping the parts in working order.

It is an object of the invention to provide a simple, compact, and efficient mechanism for measuring the surface areas of sheet material which will obviate the objections already mentioned and at the same time possess advantages which will be set forth at length in the detailed specification.

To this end and in accordance with important features of the invention there is provided a measuring member for contact with the work that is at all times connected to the totalizing or registering mechanism of the machine by means of a flexible member arranged to be wound on and off the measuring member. While being wound in one direction on the measuring member the flexible member operates the totalizing and registering mechanisms to indicate measurement units. While the flexible member is being wound in the opposite direction on the measuring member, the totalizing and registering mechanisms are released to move toward initial or zero position. By this arrangement the use of all gearing is obviated. In the illustrated machine the measuring member is a wheel provided with a plurality of circumferential surfaces at different distances from the center of rotation of the wheel so that upon rotation of the wheel portions of the flexible member may be wound off one surface onto another, thus varying the effective length of the said flexible member. When the measuring wheel is rotated in a measuring operation the illustrated flexible member is wound on the wheel in the direction to shorten its effective length, whereby a unit of the registering mechanism is pulled upon to record the movement of the wheel. When the wheel is released at the termination of the measuring operation, it is returned by wheel moving means, illustrated as a spring, to initial position during which time the flexible member is wound in the reverse direction on the wheel so that its effective length between the wheel and the registering unit of the registering and totalizing mechanism is increased, whereby the latter is allowed to return to initial position.

Since the variations in the effective length of the flexible member depend upon differences between the circumferential surfaces on the wheel, and not upon the size of the wheel, it is clear that the measuring wheel may be made smaller in diameter than is possible or desirable in prior constructions. In this way the error due to the thickness dimension of the piece of work undergoing surface measurement is substantially reduced. Furthermore, since the wheel is spaced from the bed roll, a piece of material as it is entered between the wheel and the bed roll, may approach closely adjacent to the plane joining the axes of the wheel and of the bed roll before lifting the wheel and starting the measuring, whereby the error in measuring inherent in the Sawyer type of machine is markedly lessened. When operating upon relatively thick material the measuring wheels should all be adjusted farther from the bed than is the case when relatively thin material is being measured, care being taken that the wheels are not lifted so high as to eliminate pressure of the wheels upon the stock being fed, since it is the friction between the wheels and the stock which causes the wheels to turn in their measuring operations. It will be understood that adjustment of the wheels upwardly when the stock is thick has the advantage of reducing the distance of the entering end of the stock from the plane passing through the axes of the measuring wheels and of the bed roll thereby reducing the error in measurement. A further advantage in having the wheels spaced from the bed roll resides in the fact that, since the wheels are not driven by contact with the bed roll, they may be permanently connected to the totalizing and registering mechanism so that there is no movement of parts into and out of engagement at every measuring operation, the latter being an objectionable feature of several types of measuring machines.

Where, as in this and similar constructions, a measuring wheel is returned to initial position, it is necessary to provide a positioning means for determining the initial position of the wheel. In the illustrated machine this positioning means is a latching member which is conveniently controlled by the flexible member already mentioned. Other features relate to improved mounting of the measuring wheels and to efficient and readily releasable locking means for preventing the measuring wheels from turning in the wrong direction.

Other features of the invention and novel combinations of parts will be described in the detailed specification and pointed out in the appended claims.

In the drawings,

Figure 1 is a view in front elevation of a measuring machine showing one embodiment of the invention;

Fig. 2 is a vertical, transverse sectional view of the machine shown in Fig. 1;

Fig. 3 is a detail view similar to Fig. 2 but on a larger scale; and

Fig. 4 is a perspective view of details shown in Figs. 2 and 3.

In the illustrated machine there is provided a table 10 over which the sheet material is fed to a work supporting and feeding roll 12, the latter being power driven by any suitable means such as that illustrated in the drawing which comprises a shaft extension 14 and fast and loose pulleys 16 and 18. Fixedly secured to frame uprights 20, 22 of the machine frame is a bracket 24 in spaced relation to the table 10 and in parallel relation to the bed roll 12. At the rear part of the machine is a similar bracket 26 which is preferably in a plane below bracket 24 and parallel thereto. Pivoted upon brackets 28 (Fig. 4) extending upwardly from the main bracket 26 is a plurality of supporting members 30 each of which carries rotatably mounted thereon a measuring wheel 32. Referring particularly to Figs. 2 and 4 of the drawings, it will be observed that the supporting member 30 pivoted at 34 on the bracket 28 carries at its front end an adjusting member 36, passing through a perforation in the end of the supporting member 30 and contacting with the upper surface of the bracket 24. Upon manipulation of the adjusting member 36 the forward end of the supporting member 30 is adjusted toward and from the bracket 24 by which means adjustment of the wheel 32 with respect to the bed roll 12 is secured. As shown, the wheel 32 is so adjusted as to be just out of contact with respect to the bed roll 12, the arrangement being such that upon introducing a piece of material between the bed roll 12 and the wheel 32 the latter will be rotated as long as the material is passing under the wheel and over the roll 12, thus making of the wheel 32 a measuring wheel.

The illustrated means for transmitting the rotation of each measuring wheel 32 to a registering mechanism comprises a flexible member in the form of a metal ribbon 40. In the illustrated construction, each wheel 32 is provided in its circumferential surface with a plurality of grooves of different depths. As shown, two grooves are provided, the groove 42 being relatively shallow and 44 relatively deep. It will be understood that the floor of the groove 42 provides a circumferential surface or pulley which is greater in diameter than the circumferential surface or pulley at the bottom of the groove 44. Passing around each wheel 32 with portions thereof in the grooves 42 and 44 is the metal ribbon 40. It will be clear that, if the wheel 32 be turned in a direction to wind portions of the ribbon from the groove 44 to the groove 42, the ribbon will be shortened in its effective length since it will be wound in effect from a smaller to a larger pulley. This takes place upon rotative movement of the wheel 32 during a measuring operation. If, on the other hand, the wheel is turned in the opposite direction the ribbon is wound from the larger pulley onto the smaller one at the bottom of the groove 44 and hence the effective length of the ribbon 40 is increased, thus permitting return of the totalizing and registering mechanism to initial position ready for a measuring operation on another piece of work. It will be understood that means is provided, as hereinafter described, for maintaining friction between the ribbon 40 and the surfaces at the bottom of the grooves 42 and 44 so that there is no slipping of the ribbon in the grooves during the winding operations. Since the variations in the effective length of the ribbon 40 depends upon the difference between the circumferential surfaces at the bottom of the grooves 42 and 44 and not upon the size of the wheel 32, it is clear that the measuring wheels may be made smaller in diameter than is usual thus reducing the error due to the spacing of the entering edge of the leather from the plane joining the axes of the measuring wheels and the bed roll. Preferably, and as shown, the ribbon 40 is passed into grooves of equal depths extending around idler pulleys 50, 52 (Fig. 4) which turn freely upon a shaft 54 extending from one frame standard 20 to the other 22 at the rear of and above the plane of the wheels 32. Since the flexible member or ribbon 40 is engaged by means of a loop therein with a roller 56 on one end of a lever 58 (Fig. 1) it follows that, upon shortening the effective length of the ribbon, the lever 58 is pulled downwardly. This movement of lever 58 is transmitted through a system of levers 59 to the registering device in a well known manner. One run of the ribbon 40 passes over the idler pulley 50 and the other over idler pulley 52, these pulleys being free from each other to turn in opposite directions, the purposes of the pulleys being simply to change the direction of the ribbon and at the same time minimize the friction between the cable and the shaft 54. As will be evident from the foregoing description, rotation of the measuring wheel 32 in a clockwise direction (Fig. 4), due to passage of the material between the wheel and the bed roll 12, will result in winding the flexible member or ribbon 40 upon the larger circumferential surface within the wheel 32, thus reducing the effective length of the ribbon. It follows that the end of the lever 58 which carries the roller 56 will be depressed and that this movement of the lever 58 will be transmitted, through the various levers 59, in conjunction with other similarly produced movements in the corresponding levers of other measuring units, to the registering mechanism disclosed as a pointer and dial 130 in Fig. 1 of the drawings. Further description of the totalizing and registering mechanisms is considered to be unnecessary since the form illustrated is in all essential respects disclosed in United States Letters Patent No. 931,144, granted August 17, 1909, upon application of L. O. Ramsdell. It is to be understood, however, that in various respects applicant's invention is not limited in its application to a measuring machine employing the type of totalizing and registering mechanisms shown in the Ramsdell patent.

In order that accuracy in the measuring movements of the wheels 32 may be obtained it is necessary that each wheel should start from a predetermined initial position. Hence, there is provided in the illustrated machine a wheel positioning means in the form of a latching means for checking rotation of the measuring wheels and holding them in predetermined initial position, together with means operative to return the wheel to initial position following any displacement of the wheel from such position. In the construction shown there is provided a spring 70 seated in a recess in one side face of the measuring wheel 32 and secured at one end as at 72 to the wheel and having its other end secured to the supporting member 30 in any well-known manner, the said spring tending constantly to keep the wheel 32 in initial position or to return it thereto following any displacement from such position. Co-operating with the spring 70 in holding the wheel 32 in its initial position is a latching means already referred to which is shown as a latching member 76 (Fig. 3) having a projecting shoulder 77 to engage an abutment 78 on the flange 80 (Fig. 4) which in the construction shown is located between the two grooves 42 and 44. Backing the latching member 76 is a spring 82 located in a socket which receives the body portion of the latching member 76. Preferably and as shown, the latching member 76 is carried in the end of a bell crank lever 90 pivoted at 34 and having on its other arm 92 a weight 94 which is adjustable as may be necessary or desirable to secure the proper operation of the latching means.

Means is preferably provided for causing movement of the latching means away from the measuring wheel during rotation thereof in a measuring operation and for insuring return of the latching means to latching position at the proper time to latch the measuring wheel in its initial position. Conveniently, the flexible member or ribbon 40 is utilized in securing the movements of the latching means just described. For this purpose the bell crank lever 90 which carries at one end the latching member 76 is provided at a point intermediate between its ends with a roller 100 (Fig. 3) over which is passed a single loop 102 of the flexible member or ribbon 40, the arrangement being such that upon rotation of the measuring wheel 32 in a measuring operation the loop 102 is enlarged so that the latching member 76 is moved by the weight 94 away from the measuring wheel to release it for unimpeded movement. Upon movement of the measuring wheel 32 in the opposite direction the loop 102 is shortened, thus drawing the bell crank lever 90 toward the measuring wheel 32 and insuring return of the latching member 76 into position to engage with the shoulder 78 upon the wheel 32 whereby the latter is stopped positively in initial position. In order that the latching member 76 may not strike the wheel 32 in such a manner as to result in damage to the wheel or to the latching member, a check is provided in the form of an adjustable stop, that shown consisting of a screw-threaded bolt 104 (Figs. 2 and 3) threaded adjustably through the upper arm of the bell crank lever 90 and adapted to contact with a part of the supporting member 30, the bolt 104 being adjustable so as to permit return of the latching member to operative position without undue violence on contact with the wheel 32.

As heretofore stated, means is provided for preventing the ribbon 40 from slipping in the grooves 42, 44 during the winding operations. In the illustrated construction, this means is conveniently provided for by utilizing the weighted lever 90 and the roller 100 carried thereby. Since the ribbon 40 passes around the roller 100 as a loop between the larger and smaller loops engaged in the grooves 42, 44, respectively, the proper tension is maintained on the ribbon in both grooves. Hence as the wheel 32 is rotated in the measuring direction, the ribbon is wound on the larger pulley in the groove 42 and off the smaller pulley in the groove 44 and the potential slack is taken up by the roller 100 as it moves farther and farther away from the wheel 32 under influence of the weight 94. This operation results in shortening the length of the loop between pulleys 50, 52 and the roller 56. Since the effective length of the ribbon 40 is thus shortened the levers 59 of the registering mechanism are operated to effect a recording operation on the dial 130. When at the end of a measuring operation, the wheels 32 are moved in the reverse direction by their individual springs 70, the ribbon 40 is wound in a direction so that it is moving off the larger pulley in groove 42 and on the smaller pulley in groove 44, the loop 102 being progressively reduced in size while maintaining proper tension on the ribbon and operating as before stated to return the latch 76 to initial latching position. It will be understood that the amount of ribbon 40 wound in the grooves 42, 44 does not vary substantially. There is slightly more of the ribbon in contact with the surfaces in the grooves 42, 44, when the roller 100 is nearer to the wheel 32 than is the case when it is farther away from the wheel. The more of the ribbon 40 that is wound on the larger pulley in groove 42 and off the smaller pulley in groove 44 during contact of the measuring wheel 32 with a piece of work the greater will be the effect on the registering mechanism. Hence the recording mechanism is effected in proportion to the amount of rotation of each measuring wheel 32.

In order that the measuring wheel 32 may not rotate in a direction reverse to that of its measuring movement until the measuring operation is completed by all of the measuring units involved, there is provided a locking means for each measuring wheel. As shown, this locking means comprises a weighted clamp member 110 (Fig. 4) pivoted at 112 upon a bracket arm 114 extending from the main bracket 24, the clamp member having a cam face or surface 116 adapted to contact with the face of the measuring wheel 32, being urged in that direction by a weight 113 on the other side of the pivot 112. It will be readily understood that any movement of the wheel 32 in a direction reverse of that of the measuring movement will result in clamping the locking member 110 all the more firmly against the measuring wheel. For releasing all of the locking members simultaneously at the end of a measuring operation on a piece of material, there is provided in the construction shown, a manually-operable lever 120 (Figs. 1 and 2) secured to a shaft 122 extending across the front of the machine and journaled in brackets 123 secured to the frame uprights 20 and 22. Extending longitudinally of the machine between the uprights 20 and 22 is a bar 124 having inturned ends 126 as pivoting arms. The bar 124 is operated by arms 128 (Fig. 2) secured to the shaft 122 and is in position to act upon every one of the locking members 110 simultaneously to release the same from contact with its associated measuring wheel 32, upon swinging the lever 120 to the right in Fig. 2. Upon thus releasing the locking members 110 all of the measuring wheels 32 are returned to initial position through the operation of their individual springs 70 as before described.

In measuring operations with the illustrated machine, adjustment of the measuring wheels with respect to the bed roll 12 should first be made if the lot of material to be measured differs substantially in the matter of thickness from the material last passed through the machine in measuring operations. If the new work has a greater thickness-dimension than that last operated upon, the wheels 32 may be spaced a slightly greater distance from the bed roll 12 so that the material may not lift the wheels until it is near the plane joining the axes of the measuring wheels and the roll. One reason for the adjustment of the measuring wheels with respect to the bed roll resides in the fact that the measuring wheels should not at any time contact with the bed roll to be driven thereby. Should such contact take place, operation of the totalizing and registering mechanisms would follow since the measuring wheels are permanently connected to the said mechanisms by the flexible members or ribbons 40. Having secured proper adjustment of the measuring wheels, the material to be measured is passed over the support 10 into engagement with the measuring wheels and the bed roll 12. So long as the material remains under any given measuring wheel 32, rotation of the measuring wheel continues whereby measurement and registering of the material beneath the given measuring wheel is secured. At any time that the measuring wheel fails to contact with the material the measuring operation ceases, so that it is by the addition of the measuring results from all of the measuring wheels 32 that the area of the piece of material is determined and registered on the registering mechanism 130. At the end of a measuring operation upon a given piece of material it is necessary merely to operate the manually-operable member 120 to release all of the measuring wheels 32 which promptly return to initial position. The machine is then in condition for measuring operations upon a succeeding piece of material.

Having described my invention, what I claim as new and desire to secure by Letters Patent of the United States is:—

1. In a machine for measuring surface areas of sheet material, means for supporting a piece of work to be measured, a movable measuring member supported for contact with the work, a flexible member arranged to have more or less of it wound on and off the measuring member during movement of the latter to change its effective length, and a totalizing mechanism made up of similar units one of which is connected to the flexible member to be operated thereby during movement of the measuring member.

2. In a machine for measuring surface areas of sheet material, a support over which the material to be measured is passed, a movable measuring member supported for contact with the material, said movable member having in its peripheral surface a plurality of grooves of different depths, a flexible member having portions in the different grooves and arranged to have its effective length varied upon movement of the measuring member, and a totalizing mechanism comprising a number of similar units, one of which is connected to the flexible member to be operated thereby.

3. In a machine for measuring surface areas of sheet material, a driven roll over which the material to be measured is passed, a measuring wheel supported above the roll for contact with the work so that the former is driven by the latter, means operative to return the wheel to initial position following movement of the wheel away from such position, a locking pawl arranged to engage the wheel and in co-operation with the means to hold it in initial position, a member co-operating with the wheel for preventing backward rotation of the wheel, and a manually operable member for releasing said member.

4. In a machine for measuring surface areas of sheet material, means for feeding the work to be measured, a rotatable measuring member supported for contact with the work, said measuring member having a plurality of circumferential surfaces differing each from the other a predetermined amount, a flexible member having portions movable along with the different surfaces upon rotation of the measuring member whereby the effective length of the flexible member is varied, and a totalizing mechanism having a plurality of similar units one of which is adapted to be operated by the flexible member.

5. In a machine for measuring surface areas of sheet material, a measuring wheel having a plurality of circumferential surfaces of different extent, a flexible member having portions movable along the surfaces during rotation of the wheel whereby the effective length of the flexible member is varied, a totalizing mechanism having a plurality of similar units to one of which the flexible member is connected to be operated thereby, and a latching means controlled by the flexible member and operative to determine the initial position of the measuring wheel.

6. In a machine for measuring surface areas of sheet material, a roll for supporting and feeding material to be measured, a plurality of measuring wheels mounted above the roll, each wheel having a plurality of circumferential surfaces of different extent, flexible members, each having portions movable along the surfaces of the measuring wheels during rotation thereof whereby the effective length of each flexible member is varied, a lever mounted adjacent to the wheel, a roll mounted on the lever and adapted to be engaged by the flexible member, and a latching means carried by the lever and operative to determine the initial position of the wheel.

7. In a machine for measuring surface areas of sheet material, a roll for supporting and feeding material to be measured, a plurality of measuring wheels mounted above the roll for contact with the material, each wheel having a plurality of circumferential surfaces of different extent, a flexible member having portions movable along the surfaces of each wheel during rotation thereof to change the effective length of the flexible member, a latching means for determining the initial position of the wheel, and a member on the latching means adapted to be engaged by the flexible member for controlling the latching means.

8. In a machine for measuring surface areas of sheet material, a roll for supporting and feeding the material to be measured, a measuring wheel mounted above the roll for contact with the material, said wheel having a plurality of circumferences of different extent, a flexible member adapted to be wound over the wheel and on the surfaces so that rotation of the wheel by the material winds the flexible member from a smaller circumferential surface onto a similar larger surface thereby shortening the effective length of the flexible member, and a totalizing mechanism comprising a plurality of similar units to one of which the flexible member is connected to be operated thereby upon shortening the effective length of the flexible member.

9. In a measuring machine, a support for a piece of work to be measured, a measuring wheel supported above the work support out of contact therewith and adapted to be rotated by the work, a flexible member arranged to be wound on and off of the wheel during rotation of the latter to vary the effective length of the flexible member, and a totalizing mechanism made up of similar units to one of which the flexible member is attached to actuate the same upon rotation of the wheel in one direction.

10. In a measuring machine, a roll over which the material to be measured is passed, a relatively small measuring wheel supported above the roll in adjustably spaced relation thereto and adapted to be rotated by the work, said wheel having in its peripheral surface a plurality of circumferential surfaces of different extent, a flexible member having portions movable along different surfaces of the wheel to vary the effective length of the flexible member, and a totalizing mechanism comprising a number of similar units one of which is connected to the flexible member to be actuated thereby.

11. In a measuring machine, a roll for supporting and feeding the material to be measured, a measuring wheel above the roll adapted to contact with the material, a member having a bearing for rotatably supporting the wheel, a spring mounted on the bearing, secured to the wheel and to the supporting member, and constantly tending to move the wheel in one direction, a latching member for determining in conjunction with the spring the initial position of the wheel, and a flexible member connected to the wheel and adapted to be wound thereon when the wheel is turned, a portion of the flexible member being connected to the latching member to control the same.

12. In a measuring machine, a roll for supporting and feeding the material to be measured, a measuring wheel mounted above the roll in spaced relation thereto and adapted to contact with the work, a flexible member adapted to be wound upon the wheel when the latter turns in its measuring operation, a latching member for determining the initial position of the wheel, means constantly tending to remove the latching member from contact with the wheel, and a roll on the latching member for engagement with a portion of the flexible member so that the flexible member returns the latching member to operative position at a predetermined point in the reverse rotation of the measuring wheel.

13. In a measuring machine, means for supporting a piece of work to be measured, a movable measuring member supported for contact with the work, a flexible member arranged to have portions thereof wound on and off the measuring member, and a registering mechanism connected to the flexible member to be operated thereby during movement of the measuring member.

14. In a measuring machine, a roll over which the material to be measured is passed, a movable measuring member supported for contact with the material, said movable member having in its peripheral surface a plurality of grooves of different depths, a flexible member having portions in the different grooves and arranged to have its effective length varied upon movement of the measuring member, and a registering mechanism connected to the flexible member to be operated thereby.

15. In a measuring machine, a roll for supporting and feeding material to be measured, a plurality of measuring wheels mounted above the roll for contact with the material, each wheel having a plurality of circumferential surfaces of different extent, flexible members having portions movable along the surfaces of the measuring wheels whereby the effective length of each flexible member is varied, and a registering mechanism arranged to be operated by the flexible members.

16. In a machine for measuring surface areas of sheet material, means for supporting a piece of material to be measured, a movable measuring member having in its peripheral surface a plurality of grooves of different depths, a flexible member having portions in the different grooves and arranged to have its effective length varied upon movement of the measuring member, and a totalizing mechanism comprising a number of similar units, one of which is connected to the flexible member to be operated thereby.

17. In a machine for measuring surface areas of sheet material, a driven roll over which the material to be measured is passed, a measuring wheel supported for contact with the work so that the former is rotated by the latter, means operative to return the wheel to initial position following rotation of the wheel away from such position, and means arranged to engage the wheel and in co-operation with the above-mentioned means to hold it releasably in initial position.

In testimony whereof I have signed my name to this specification.

GEORGE E. McLAUGHLIN.